(12) United States Patent  
Lee

(10) Patent No.: US 8,173,296 B2
(45) Date of Patent: May 8, 2012

(54) LITHIUM RECHARGEABLE BATTERY

(75) Inventor: Youhoon Lee, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 1218 days.

(21) Appl. No.: 11/935,633

(22) Filed: Nov. 6, 2007

(65) Prior Publication Data

US 2008/0152997 A1  Jun. 26, 2008

(30) Foreign Application Priority Data

Dec. 21, 2006  (KR) .................. 10-2006-0131959

(51) Int. Cl.
 *H01M 2/08*  (2006.01)
(52) U.S. Cl. ....................................... 429/185; 429/174
(58) Field of Classification Search .................. 429/164, 429/171, 174, 180, 185
See application file for complete search history.

(56) References Cited

U.S. PATENT DOCUMENTS

2007/0154804 A1 *  7/2007  Kim et al. ................... 429/185
2007/0224494 A1 *  9/2007  Kim ............................ 429/142

FOREIGN PATENT DOCUMENTS

JP          7-153488    6/1995
KR          2001-77594  8/2001

* cited by examiner

*Primary Examiner* — Patrick Ryan
*Assistant Examiner* — Muhammad Siddiquee
(74) *Attorney, Agent, or Firm* — Knobbe Martens Olson & Bear LLP

(57) ABSTRACT

A lithium rechargeable battery comprising: an electrode assembly including a cathode plate and an anode plate facing each other; a separator provided between the cathode plated and the anode plate; a can to receive the electrode assembly; a cap assembly to seal an upper opening of the can; an upper insulation plate located between the electrode assembly and the cap assembly; and a gasket located between the cap assembly and the can. An outer layer of the separator is wound on an outer portion of the electrode assembly and is exposed above the upper insulation plate.

11 Claims, 4 Drawing Sheets

LITHIUM RECHARGEABLE BATTERY

CROSS-REFERENCE TO RELATED APPLICATION

This application claims the benefit of Korean Application No. 2006-131959, filed Dec. 21, 2006, in the Korean Intellectual Property Office, the disclosure of which is incorporated herein by reference.

BACKGROUND OF THE INVENTION

1. Field of the Invention

Aspects of the present invention relate to a lithium rechargeable battery.

2. Description of the Related Art

Generally, rechargeable batteries, for use in portable devices, such as, video cameras, portable phones, portable computers, and others, have been actively researched. The rechargeable batteries include a nickel cadmium battery, a nickel hydrogen battery, a nickel zinc battery, a lithium rechargeable battery, and others. Among these rechargeable batteries, the lithium rechargeable battery has a large capacity, a compact size, a high operation voltage, and a high energy density per unit weight, so it is widely used for the latest electronic devices.

When an external impact, such as a drop, occurs to a cylindrical-type lithium rechargeable battery, an electrode assembly of the battery is liable to fluctuate or rotate inside the battery can. When the electrode assembly fluctuates or rotates by a predetermined extent, an electrode tab, attached to the electrode assembly, fluctuates or rotates simultaneously. In this case, the weld between the cathode tab and a safety vent can be broken, and an internal circuit of the battery can be electrically disconnected.

In addition, the cylindrical lithium rechargeable battery includes a beading part inside the battery, between an upper insulation plate and a lower end of a gasket. Thus, there is a problem in that the cathode tab contacts the beading part, to cause an electrical short, when the lithium rechargeable battery is impacted by an external shock, or during the welding process of the cathode tab and a cap assembly.

SUMMARY OF THE INVENTION

Aspects of the present invention relate to a lithium rechargeable battery that can prevent an electrical short between an electrode tab and a can.

Other aspects of the present invention relate to a lithium rechargeable battery that can prevent the fluctuation of the electrode assembly inside the can, when the battery experiences an external impact, such as a drop.

According to aspects of the present invention, there is provided a secondary battery, which includes: an electrode assembly including a cathode plate and an anode plate facing each other, and a separator interposed between the cathode plate and the anode plate; a can to receive the electrode assembly; a cap assembly to seal an upper opening of the can; an upper insulation plate located between the electrode assembly and the cap assembly; and a gasket located between the cap assembly and the can. An outer layer of the separator, which is wound around an outer portion of the electrode assembly, extends above the upper insulation plate.

According to aspects of the present invention, an upper end of the outer layer may be located between the gasket and the can, or between the gasket and the cap assembly.

According to aspects of the present invention, there is provided a secondary battery, which includes: an electrode assembly including a cathode plate and an anode plate facing each other, and a separator provided between the cathode plate and the anode plate; a can to receive the electrode assembly; a cap assembly to seal an upper opening of the can; an upper insulation plate located between the electrode assembly and the cap assembly; a gasket located between the cap assembly and the can; and an insulation tape attached to at least a part of the outer portion of the electrode assembly and extending to an upper part of the upper insulation plate.

According to aspects of the present invention, an upper end of the insulation tape may contact a lower end of the gasket, and be located between the gasket and the can, or may be located between the gasket and the cap assembly.

According to aspects of the present invention, the insulation tape may be formed of a polymer material. The polymer material may a polymer containing an ester group or a carboxy group, polyvinylfluoride (PVdF), polybutadien, or polyisoprene.

According to aspects of the present invention, the insulation tape may be double-sided tape including a pressure-sensitive adhesive layer, or an adhesive layer, on at least an upper end of tape that contacts the can. The double-sided tape can be folded or deformed during processes, such as, a beading process of the can, or an inserting process of the gasket into the can, after the electrode assembly is inserted into the can.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION OF THE EXEMPLARY EMBODIMENTS

Figure 1:
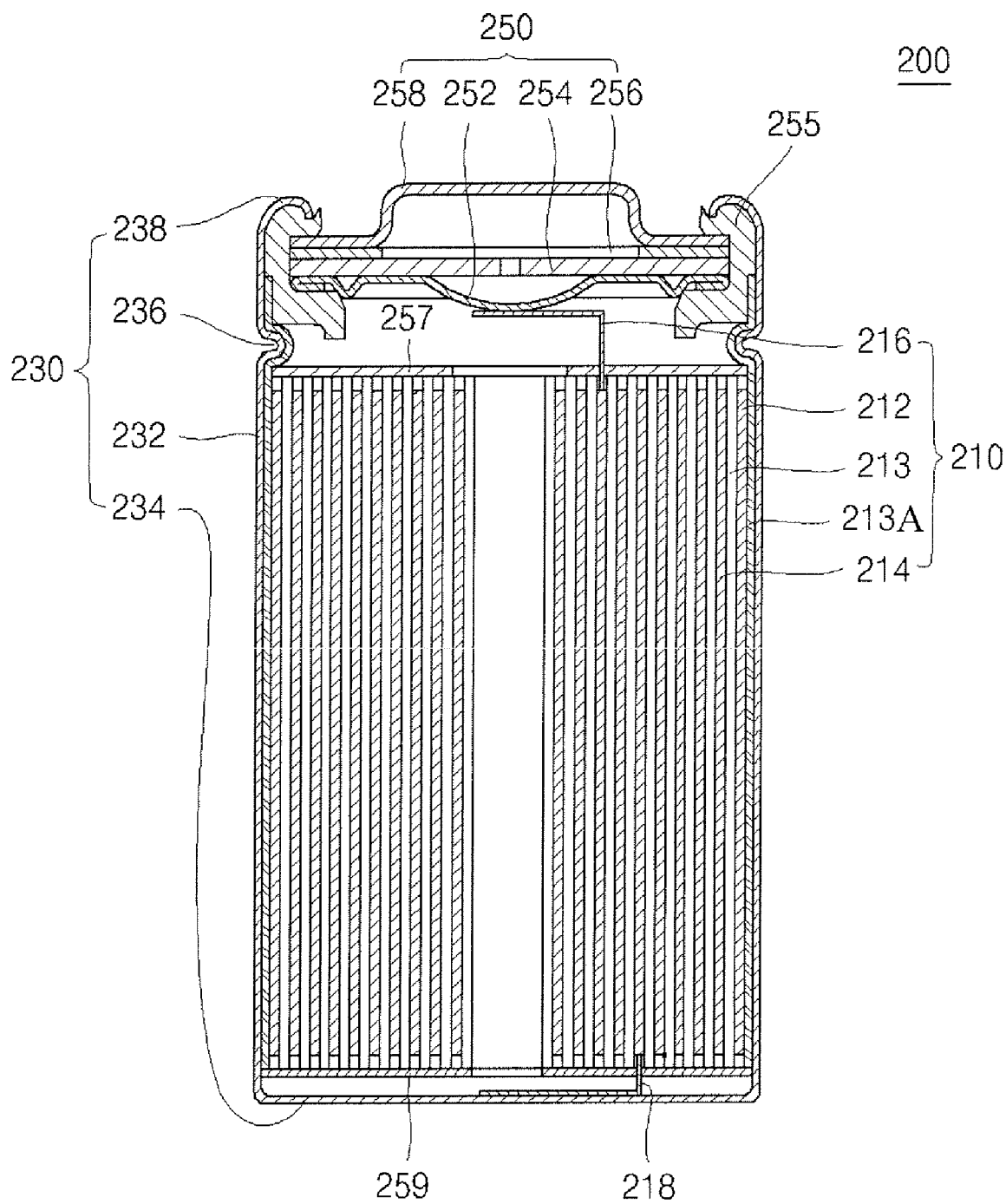
FIG. 1 is a sectional view illustrating a lithium rechargeable battery, according to an exemplary embodiment of the present invention.

Reference will now be made in detail to the exemplary embodiments of the present invention, examples of which are illustrated in the accompanying drawings, wherein like reference numerals refer to the elements throughout. The embodiments are described below, in order to explain the aspects of present invention, by referring to the figures.

Referring to FIG. 1, a lithium rechargeable battery 200 is illustrated, according to an exemplary embodiment of the invention. The lithium rechargeable battery 200 includes an electrode assembly 210, a can 230, and a cap assembly 250. In addition, the lithium rechargeable battery 200 may further include an upper insulation plate 257 and a gasket 255. Hereinafter, a cylindrical lithium rechargeable battery will be illustrated as an example, but it should be understood that various battery shapes can be used, such as, an elliptical shape, a polygonal shape, and the like, depending on a particular design.

Figure 2:
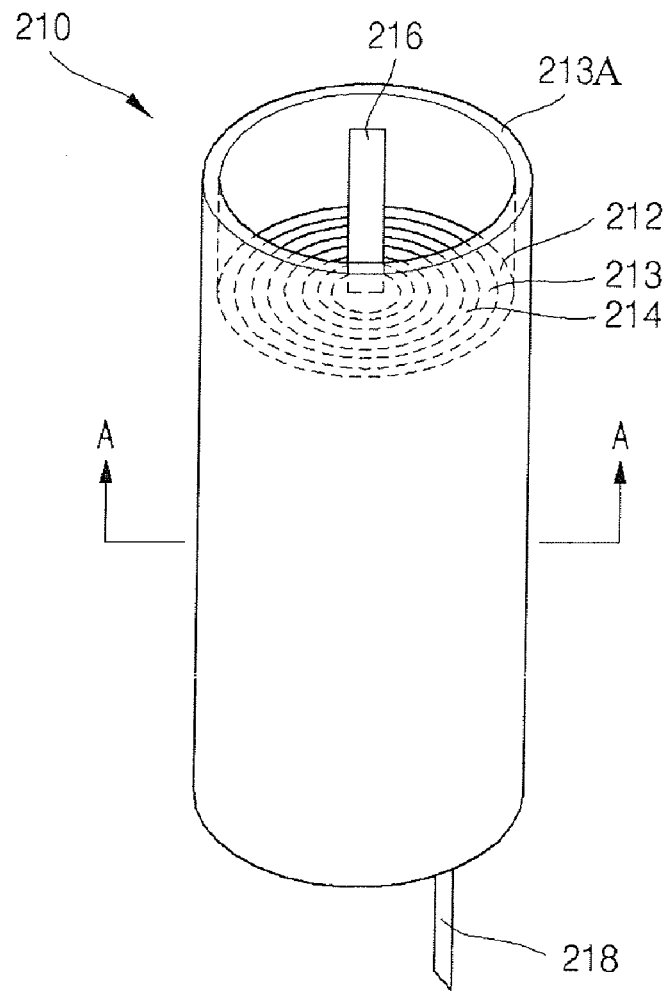
FIG. 2 is a perspective view illustrating an electrode assembly of FIG. 1.
Figure 3:
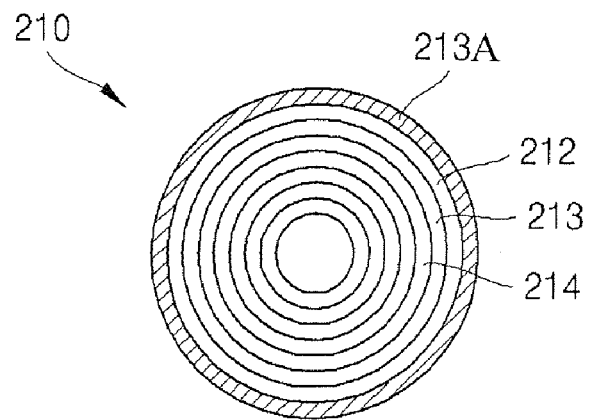
FIG. 3 is a sectional view taken along line A-A of FIG. 2.

Referring to FIG. 2, the electrode assembly 210 includes a cathode plate 212, an anode plate 214, and a separator 213. The electrode assembly 210 includes a cathode tab 216 and an anode tab 218.

The cathode plate 212 includes a cathode collector, a cathode active material layer, and a cathode uncoated part. The cathode collector is made of a conductive material, so that the cathode collector collects electrons from the cathode active material layer and transfers the electrons to an external circuit. The cathode active material layer is formed by mixing a cathode active material, a conductive material, and a binder, and is coated at a predetermined thickness on the cathode collector. The cathode uncoated part is a part of the cathode collector that is not coated with the cathode active material. The cathode tab 216 is welded to one side of the cathode uncoated part.

The anode plate 214 includes an anode collector, an anode active material layer, and an anode uncoated part. The anode collector is made of a conductive material, so that the anode collector collects electrons from the anode active material layer and transfers the electrons to an external circuit. The anode active material layer is formed by mixing an anode active material, a conductive material, and a binder, and is coated at a predetermined thickness on the anode collector. The anode uncoated part is a part of the anode collector that is not coated with the anode active material. The anode tab 218 is welded to one side of the anode uncoated part.

The cathode tab 216 and the anode tab 218 are respectively welded to the cathode uncoated part and the anode uncoated part, to electrically connect the electrode assembly 210 to other parts of the battery. The cathode tab 216 and the anode tab 218 are welded by, for example, resistance welding and the like. An insulation tape (not shown) may be attached to the welded part, to prevent an electrical short and heat generation. However, the method for welding the cathode tab 216 and the anode tab 218 is not limited thereto.

The separator 213 is interposed between the cathode plate 212 and the anode plate 214 and may surround the outer circumference of the electrode assembly 210. The separator 213 prevents the cathode plate 212 and the anode plate 214 from being electrically shorted and is formed of polymer porous film, so as to allow for the passage of lithium ions there through. The separator 213 may be wound around an outer portion of the electrode assembly 210. The outer portion of the electrode assembly 210 may be the cathode plate 212 or the anode plate 214, and can include the separator 213. The separator 213 may be wound twice, or more, around the outer portion of the electrode assembly 210, in order to prevent the cathode plate 212 or the anode plate 214 from directly contacting the inner circumference of the can 230. Hereinafter, the separator 213, wound on the outer portion, is called an outer layer 213A.

Referring again to FIG. 1, the outer layer 213A may extend above the upper insulation plate 257. Generally, the separator is formed to project past the cathode plate and/or the anode plate. This prevents the upper ends and/or the lower ends of the plates from being electrically shorted.

The outer layer 213A extends above the upper insulation plate 257. The electrode assembly 210 is electrically insulated from the cap assembly 250, by the upper insulation plate 256 and the upper end of the outer layer 213A.

An upper end of the outer layer 213A may be located between the gasket 255 and the can 230. That is, the upper end of the outer layer 213A may be inserted between the gasket 255 and the can 230. The upper end of the outer layer 213A, inserted between the gasket 255 and the can 230, may extend to about 20~80% of the total height of the gasket 255. The numerical value is just only an example, and the present teachings are not limited thereto.

The outer layer 213A may contact a region of the gasket 255 adjacent to the beading part 236. The upper end of the outer layer 213A is fixed between the gasket 255 and the can 230, so that the electrode assembly 210 is fixed inside the can 230 and does not fluctuate due to external impacts or forces. If the fluctuation of the electrode assembly 210 is prevented, the fluctuation of the cathode tab 216 and/or the anode tab 218 are also prevented, and thus, can prevent the welded part of the cathode tab 216, or anode tab 218, from being separated. In addition, the cathode tab 216 does not contact the beading part 236, when folding or welding the cathode tab 216, thereby preventing an electrical short. The upper end of the outer layer 213A facilitates a tight connection between the gasket 255 and the can 230, thereby preventing the electrolytic solution from being leaked, via a gap between the gasket 255 and the can 230.

The can 230 is cylindrical and includes a side plate 232 and a bottom plate 234. The side plate 232 has an outer circumference and an inner circumference, which form roughly concentric circles around each other, and a bottom plate 234, which has a front face and a rear face roughly parallel each other. The upper end of the can 230 is open and defines an upper opening, through which the electrode assembly 210 is inserted, and the electrolytic solution is injected. A lower insulation plate 259 may be inserted between the bottom plate 234 and the electrode assembly 210, to insulate the can 230 from the electrode assembly 210.

The beading part 236 is formed on the upper end of the can 230, to prevent the electrode assembly 210 from fluctuating inside the can 230, after the insertion of the electrode assembly 210, and to fix the cap assembly. A creeping part 238 may be formed to seal the battery, after the insertion of the electrode assembly 210. The upper insulation plate 257 may be inserted between the upper end of the electrode assembly 210 and the cap assembly 250, to insulate the electrode assembly 210 and the cap assembly 250. The can 230 can be made of aluminum, an aluminum alloy, or any suitable conductive material that is light and has excellent softness. The can 230 can be formed by a deep drawing method, but is not limited thereto.

The cap assembly 250 includes: a safety vent 252, which can be deformed by pressure generated inside the battery; a current interrupting unit 254 to interrupt current flow by breaking due to the deformation of the safety vent 252; a secondary protecting element 256 to decrease the electrical conductivity, according to a temperature increase; and a cap up 258 that covers the upper part of the battery and functions as a cathode terminal. The cap assembly 250 is further provided with the gasket 255 to insulate the cap assembly 250, which functions as a cathode, from the can 230, which functions as an anode. The upper end of the outer layer 213A of the separator 213, is located between the gasket 255 and the can 230, as described above.

Figure 4:
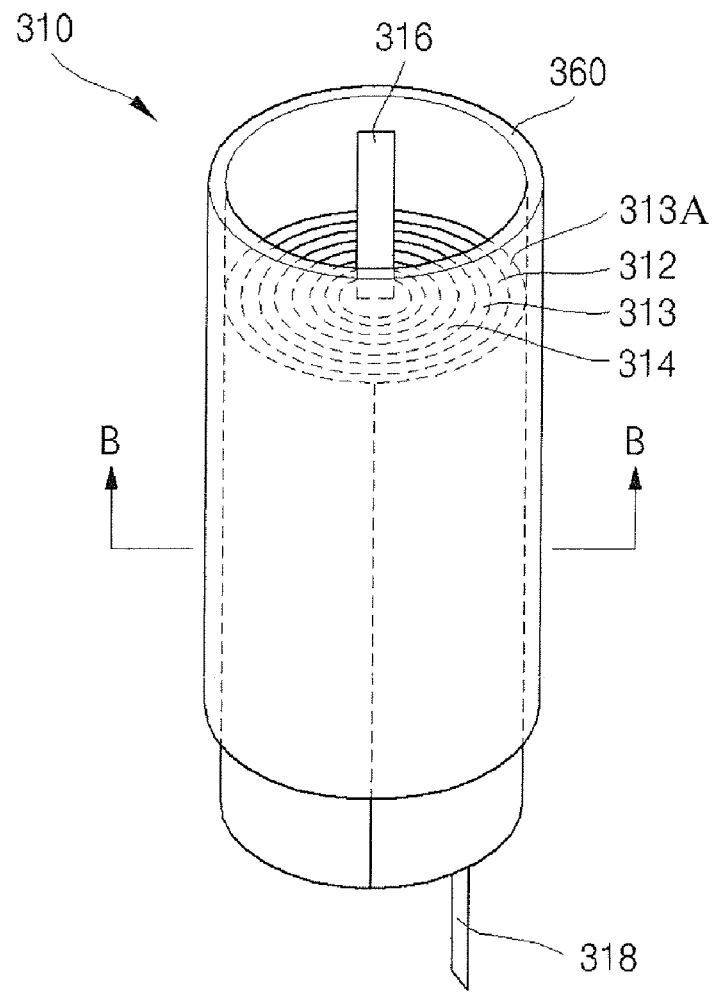
FIG. 4 is a perspective view illustrating an electrode assembly, according to an exemplary embodiment of the present invention.
Figure 5:
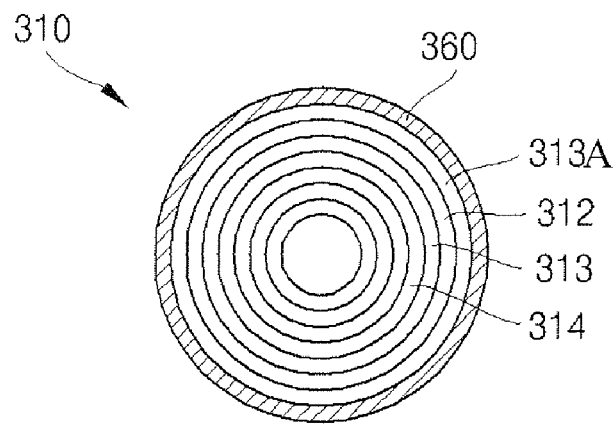
FIG. 5 is a sectional view taken along line A-A of FIG. 4.

FIG. 4 is a perspective view illustrating an electrode assembly 310, according to another exemplary embodiment of the present invention, and FIG. 5 is a sectional view taken along line A-A of FIG. 4. The electrode assembly 310 is the same as the electrode assembly 210, of FIG. 2, except that an insulation tape 360 is inserted between the gasket and the can. Accordingly, the differences will be explained below.

The electrode assembly 310 can form a lithium rechargeable battery in conjunction with a can and a cap assembly (not shown), for example, the can 230 and the cap assembly 250. In addition, the lithium rechargeable battery may include a gasket and an upper insulation plate (not shown), for example, the gasket 255 and the upper insulation plate 257. The can and the cap assembly have been sufficiently explained in the embodiment of FIG. 1. Thus, the detailed description will be omitted.

Referring to FIG. 4 and FIG. 5, the electrode assembly 310 includes a cathode plate 312, an anode plate 314, and a separator 313. In addition, the electrode assembly 310 includes a cathode tab 316, an anode tab 318, and an insulation tape 360.

The insulation tape 360 is attached to an outer portion of the electrode assembly 310, to prevent the electrode assembly 310 from unfastening. The insulation tape 360 is attached to the outer portion (circumference) of the electrode assembly 310, including an upper end thereof where the winding is finished. The insulation tape 360 may be formed on only the upper end of the electrode assembly 310. However, the insulation tape 360 can be formed to surround the outer portion and the upper end of the electrode assembly 310.

In addition, the insulation tape 360 may extend above an upper insulation plate (not shown). An outer layer 313A of the separator 313 may be the same height as the rest of the separator 313. The outer layer 313A may extend above the upper insulation plate, like the insulation tape 360. When the outer layer 313A is extended with the insulation tape 360, the combined thickness thereof, may become to large to be inserted between the gasket and the can. The insulation tape 360 may surround the electrode assembly 310, or may exclude a portion of the electrode assembly 310 (a lower end), as shown in FIG. 4. An upper end of the insulation tape 360 may be located between the gasket and the can.

The insulation tape 360 may be formed of a polymer material compatible with the electrolytic solution, for example, a polymer containing an ester group or carboxy group, polyvinylfluoride (PVdF), polybutadien and polyisoprene, but is not limited thereto. The insulation tape 360 is fixed, a fluctuation of the electrode assembly 310 can thereby be prevented, and an electrical short between the cathode tab 316 and the beading part can be prevented. In addition, the electrolytic solution can be prevented from being leaked, via a gap between the can and the gasket, by the insulation tape.

Figure 6:
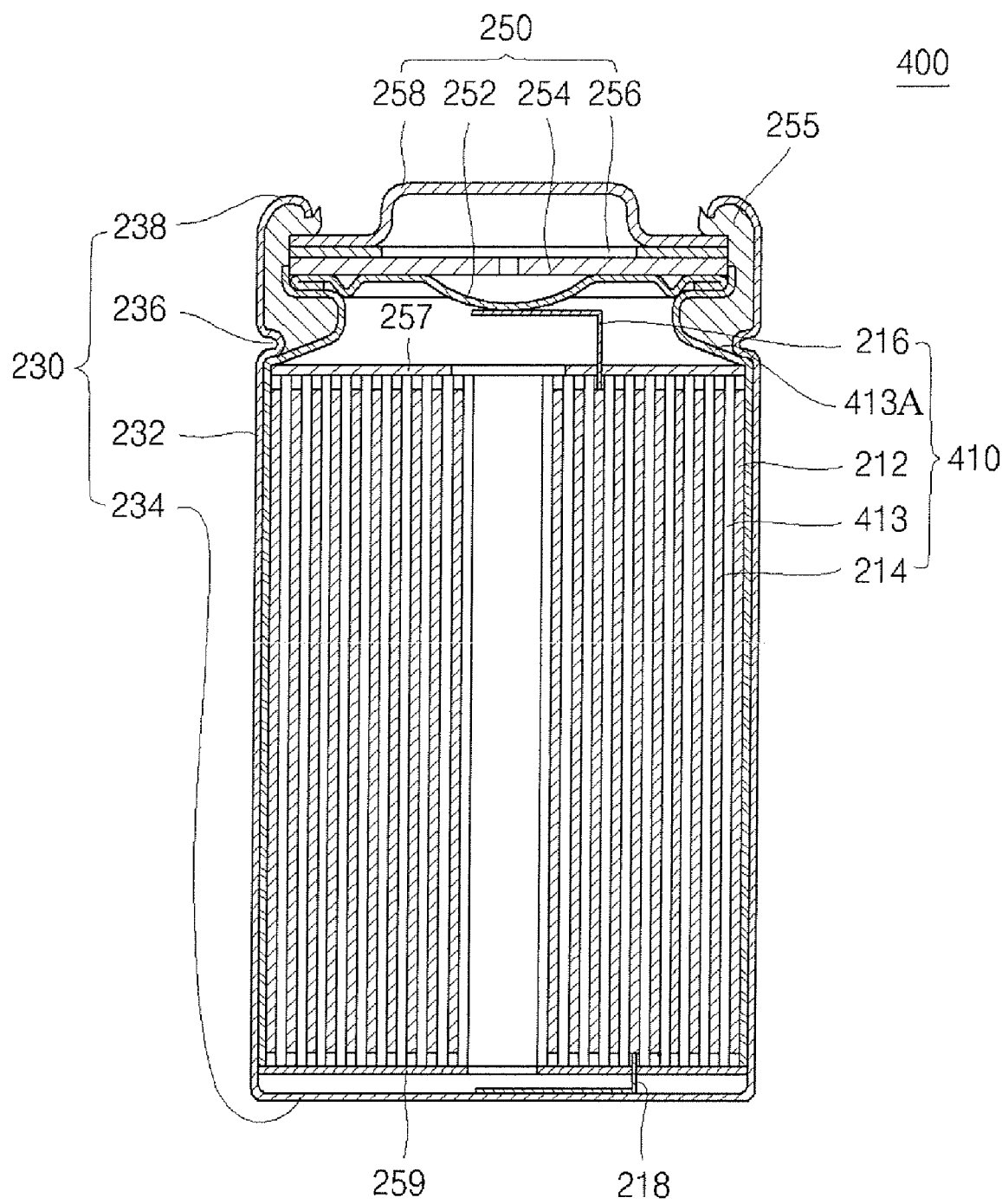
FIG. 6 is a sectional view illustrating a lithium rechargeable battery, according to an exemplary embodiment of the present invention.

FIG. 6 is a sectional view illustrating a lithium rechargeable battery 400, according to still another exemplary embodiment of the present invention. The lithium rechargeable battery 400 is similar to the lithium rechargeable battery 200, of FIG. 1, except that an outer layer 413A of a separator 413, and/or the upper end of an insulation tape, are inserted between the cap assembly 250 and gasket 255. In addition, in FIG. 6, an outer portion of the separator 413 extends as shown in FIG. 2, but the insulation tape may be extended to the upper part, as shown in FIG. 4. That is, the aspects of the exemplary embodiments of FIGS. 2 and/or 4 may be selectively applied to the embodiment of FIG. 6. For convenient explanation, the same drawing reference numerals are used for the same elements as depicted in FIG. 1.

The lithium rechargeable battery 400 includes an electrode assembly 410, a can 230, and a cap assembly 250. The lithium rechargeable battery 400 may further include a gasket 255 and an upper insulation plate 257.

The electrode assembly 410 includes a cathode plate 212, an anode plate 214, and a separator 413. The electrode assembly 410 further includes a cathode tab 216 and an anode tab 218.

An outer layer 413A of the separator 413 extends above the upper insulation plate 257. An upper end of the outer layer 413A is inserted between the gasket 255 and the cap assembly 250. That is, the upper end of the outer layer 413A may extend along the cap assembly 250 to an edge of the safety vent 252. Although not shown in the drawing, the insulation tape 360 may be inserted between the gasket 255 and the cap assembly 250, instead of, or in addition to, the outer layer 413A of the separator 413.

The outer layer 413A of the separator 413 is fixed, so that a fluctuation of the electrode assembly 410 can be prevented, and an electrical short between the cathode tab 216 and the beading part 236 can be prevented. In addition, a leakage of the electrolytic solution via a gap between the gasket 255 and the cap assembly 250 can be prevented, by the upper end of the outer layer 413A.

Hereinafter, the operation of the lithium rechargeable battery 200, according to the exemplary embodiments of the present invention will be explained. For convenience, the lithium rechargeable battery 200, according to the exemplary embodiment of FIG. 1, will be explained as an example.

Referring again to FIG. 1, the lithium rechargeable battery 200 includes the electrode assembly 210, the can 230, and the cap assembly 250. In addition, the lithium rechargeable battery 200 may further include the gasket 255 and the upper insulation plate 257.

When the lithium rechargeable battery 200 is subject to an impact or vibration, the impact and vibration are transferred to the electrode assembly 210. In addition, when the cylindrical lithium rechargeable battery 200 is rotated, the rotational force is transferred to the electrode assembly 210. The lithium rechargeable battery 200 is provided with the separator 213 wound around the outer portion of the electrode assembly 210. The separator 213 is inserted between the gasket 255 and the can 230. When the impact, the vibration, or the rotating force are applied to the lithium rechargeable battery 200, the impact, the vibration or the rotating force are transferred to the electrode assembly 210. Because the electrode assembly 210 is wound relatively tightly, most of the transferred force is applied to the outer portion of the electrode assembly 210. The outer layer 213A of the separator 213 is fixed between the gasket 255 and the can 230, thereby securing the electrode assembly 210.

During an assembling process of the lithium rechargeable battery, and particularly when the cathode tab is folded and welded, the cathode tab can contact the beading part 236, due to an operator's carelessness. When the lithium rechargeable battery 200 is impacted, the cathode tab 216 may contact the beading part 236. Because the cathode tab 216 and the beading part 236 have opposite polarities, an electrical short results. The lithium rechargeable battery 200 is provided with the outer layer 213A of the separator 213 extending to the gasket 255 and the beading part 236, thereby preventing the electrical short.

In addition, when the lithium rechargeable battery 200 is inverted or excessively vibrated, there is a possibility that the electrolytic solution can leak out of the battery. Specially, the electrolytic solution may be leaked, via the gap between the gasket and the can, or between the gasket and the cap assembly.

Since the outer layer 213A of the separator 213 is inserted between the gasket 255 and the can 230, the leakage of the electrolytic solution can be prevented. In addition, in the lithium rechargeable battery 400, since the outer layer 213A of the separator 213 is tightly inserted between the gasket 255 and the cap assembly 250, the leakage of the electrolytic solution can be prevented.

As described above, the rechargeable battery, according to aspects of the present invention, produces the following effects. If an external force, such as, a drop, vibration, and a rotating force is applied to the rechargeable battery, the electrode assembly does not fluctuate, thereby preventing the electrode tab from being electrically shorted. The rechargeable battery can prevent the electrical short caused by the contact between the cathode tab and the can. The rechargeable battery can prevent the leakage of the electrolytic solution, via the gap between the gasket and the can or between the gasket and the cap assembly. As referred to herein, an attachment layer can include an outer layer of a separator and/or an insulation tape.

Although a few exemplary embodiments of the present invention have been shown and described, it would be appreciated by those skilled in the art that changes may be made in these exemplary embodiment without departing from the principles and spirit of the invention, the scope of which is defined in the claims and their equivalents.

What is claimed is:

1. A lithium rechargeable battery comprising:
   an electrode assembly comprising:
      a cathode plate;
      an anode plate facing the cathode plate; and
      a separator provided between the cathode plate and the anode plate;
   a can housing the electrode assembly;
   a cap assembly to seal an upper opening of the can;
   an upper insulation plate disposed between the electrode assembly and the cap assembly;
   a gasket disposed between the cap assembly and the can; and
   an insulation tape attached to at least a part of an outer portion of the electrode assembly and extending above the upper insulation plate.

2. The lithium rechargeable battery of claim 1, wherein the insulation tape extends to the gasket.

3. The lithium rechargeable battery of claim 1, wherein a portion of the insulation tape is disposed between the gasket and the can.

4. The lithium rechargeable battery of claim 1, wherein a portion of the insulation tape is disposed between the gasket and the cap assembly.

5. The lithium rechargeable battery of claim 1, wherein the insulation tape comprises a polymer material.

6. The lithium rechargeable battery of claim 5, wherein the polymer material is selected from the group consisting of a polymer containing an ester group, a polymer containing a carboxy group, polyvinylfluoride (PVdF), polybutadien, and polyisoprene.

7. The lithium rechargeable battery of claim 1, wherein at least a portion of the insulation tape is a double-sided tape.

8. The lithium rechargeable battery of claim 1, wherein a portion of the insulating tape is disposed between the can and the gasket, and both surfaces of the portion of the insulating tape comprise an adhesive layer.

9. The lithium rechargeable battery of claim 1, wherein the insulating tape extends from the electrode assembly and contacts the upper insulation plate, a beading part of the can, the gasket, and a portion of the can adjacent to the gasket.

10. The lithium rechargeable battery of claim 1, wherein the insulating tape extends from the electrode assembly and contacts the upper insulation plate, a beading part of the can, the cap assembly, and a portion of the gasket adjacent to the cap assembly.

11. The lithium rechargeable battery of claim 1, wherein the insulating tape secures the electrode assembly inside the can.

* * * * *